Aug. 10, 1965   N. W. SCHUBRING   3,199,350
CAPACITANCE TYPE FUEL GAGE
Filed Nov. 27, 1961

INVENTOR.
Norman W. Schubring
BY
Paul J. Ethington
ATTORNEY

United States Patent Office 3,199,350
Patented Aug. 10, 1965

3,199,350
CAPACITANCE TYPE FUEL GAGE
Norman W. Schubring, Birmingham, Mich., assignor to General Motors Corporation, Detroit, Mich., a corporation of Delaware
Filed Nov. 27, 1961, Ser. No. 154,964
1 Claim. (Cl. 73—304)

This invention relates to a material level gage and more particularly to a fuel gage of the capacitance type.

Heretofore it has been proposed to determine the level of a dielectric material by inserting a capacitor element into the material in such a manner that the material provides at least a portion of the dielectric between the capacitor plates and hence varies the capacitance according to the level of the material. The effect of this change in capacitance on the electrical circuit associated therewith was measured by some means and was taken to be an indication of the material level. The circuits provided for that purpose have been complex and expensive and frequently required manual adjustments to balance the circuits or to otherwise determine the capacitance to measure the level of the material.

It is the aim of the present invention to provide a simple circuit whereby the material level may be determined accurately and automatically without the use of a complicated or bulky circuit assembly.

A further aim of the invention is to provide such a circuit wherein the material level indicating means and the electrical power source may be located remotely from the material reservoir and wherein the remainder of the circuitry is conveniently located at the reservoir and wherein a minimum number of circuit connections between the power source, indicator, and reservoir are required.

This invention is carried out by providing a variable capacitance element within the reservoir wherein the level of the material within the reservoir determines the capacitance thereof, a resonant circuit including the capacitor element, a fixed frequency oscillator having its output connected to the resonant circuit and having its input connected to a power source, and means associated with the resonant circuit to determine the impedance thereof.

The invention further provides means for conveniently locating the power source and the impedance measuring means at positions remote from the reservoir.

The above and other advantages of the invention will be made more apparent from the following specification taken in conjunction with the accompanying drawings wherein like reference numerals refer to like parts, and wherein.

While the invention applies to the measurement of the level of any dielectric material, the description is directed to the embodiment of the invention in the measurement of fuel level in a vehicle fuel reservoir.

Figure 1:
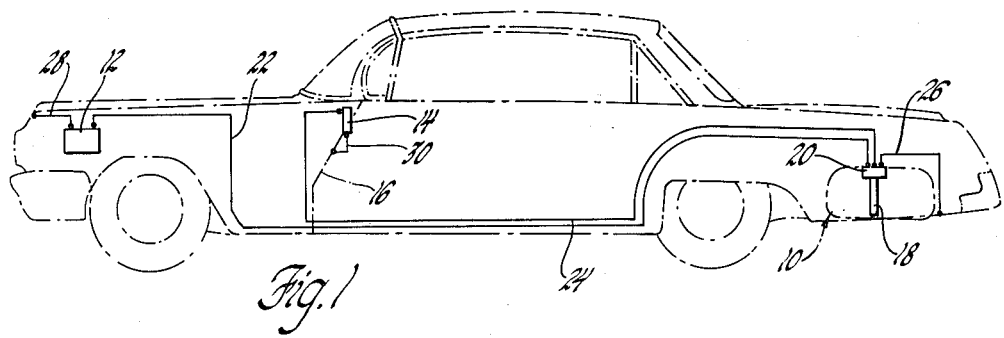
FIGURE 1 is a phantom view of a vehicle illustrating the relative locations of the components of the material level gage circuit and the material reservoir according to the invention.

FIGURE 1 shows a vehicle having a fuel reservoir 10 located at the rear thereof, a conventional vehicle battery 12 in the front of the vehicle, and a fuel level indicating meter 14 mounted on the instrument panel 16 of the vehicle. An elongated capacitance type sensing unit 18 is located vertically in the fuel reservoir 10 and has a cluster 20 of electrical components at the upper end thereof also connected to the reservoir. An electrical conductor 22 extends from the battery 12 to the component cluster 20 and a second conductor 24 is connected between the fuel level indicator 14 and the component cluster 20. A return conductor or ground conductor 26 is connected from the component cluster 20 to the vehicle body and similar ground connections 28 and 30 are provided from the battery and from the fuel level indicator 14 respectively to the body.

Figure 2:
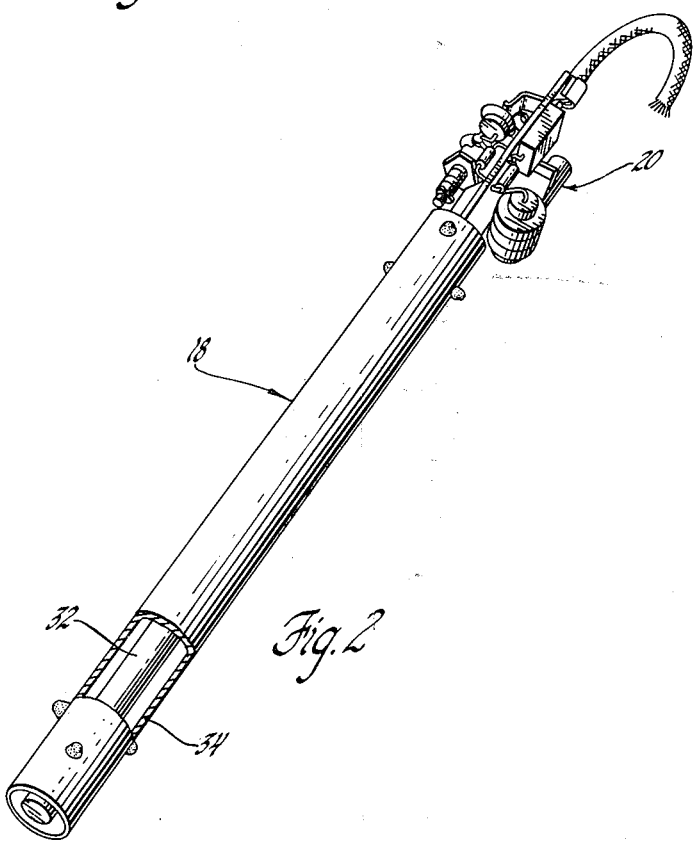
FIGURE 2 is a partly broken away view of the preferred embodiment of the variable capacitor and associated circuit components.

As shown in FIGURE 2, the capacitor element 18 comprises an elongated coaxial structure wherein an inner element 32 and an outer concentric element 34 define a space which is filled with the fuel to a level corresponding to the fuel level in the reservoir, and the space above the fuel is filled with air. The inner element 32 of the capacitor may be coated with a thin insulating coating such as Teflon to prevent shortcircuiting of the elements 32 and 34 due to the possible presence of water or other foreign material in the fuel reservoir. When this type of sensing unit 18 is used for fuel such as gasoline, the possibility of fuel ignition by sparks must be taken into consideration. It has been established that a spark having a minimum of 0.2 millijoule of energy must be released in order to ignite a mixture of air and gasoline vapor. Accordingly, the gage must be constructed and operated so that less than 0.2 millijoule may be stored in the capacitor. The preferred arrangement is a ¼ inch O.D. inner element 32 within a ½ inch I.D. outer element 34, both of which are eight inches long. This provides a capacitance of 16.3 $\mu\mu$f. in air or 32.6 $\mu\mu$f. in gasoline, since the permittivity of gasoline is approximately 2. The capacitance of the sensitive element 18 will change linearly with fuel level from 16.3 $\mu\mu$f. to 32.6 $\mu\mu$f. It has been computed that the maximum energy which is stored in such a capacitor will be less than the limit of 0.2 millijoule provided the maximum voltage applied across the capacitor does not exceed 6000 volts. For reasons to be discussed below, all of the circuitry which contains any alternating voltage is located at the site of the sensing unit 18 and hence will be conveniently mounted within the component cluster 20 at the upper end of the element 18.

Figure 3:
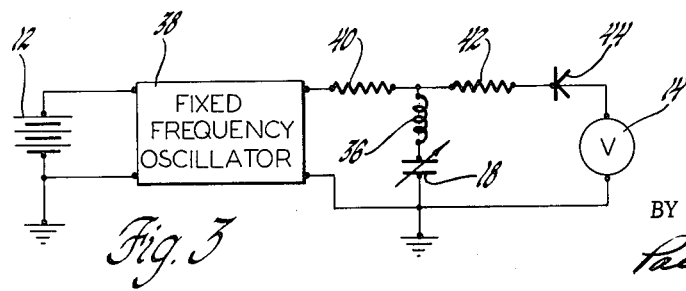
FIGURE 3 is a schematic diagram of the material level gage circuit according to the invention.

The schematic diagram of FIGURE 3 illustrates the preferred circuit for translating the capacitance of the sensing unit 18 into an indication of the fuel level. A high Q inductor ($Q=100$) 36 in series with the sensing element 18 forms a resonant circuit. A fixed frequency constant current oscillator 38 has its output connected to the resonant circuit and has its input connected to the battery 12. A high frequency oscillation is desirable, but in order to avoid radio interference, the frequency should be below both the radio IF and RF, but above audio frequencies. It is preferred to use a frequency of 394 kilocycles per second so that an inductor of practical size can be used. For this frequency an inductor of 10.85 millihenries will cause the circuit to attain resonance when the sensing element has a capacitance of 16.3 $\mu\mu$f. which corresponds to its capacitance when the fuel reservoir is empty. At this point then the impedance of the resonant circuit is zero. However, as the liquid level increases, the impedance of the circuit will increase rapidly. Since the oscillator has a constant current output the voltage across the resonant circuit will increase with its impedance and may be measured by a voltmeter 14. A large resistor 42 and diode 44 are connected in series with the voltmeter 14 so that a low current D.C. meter may be used.

The oscillator 38 may be of any desired constant frequency type. It is preferred to use a single transistor series fed Hartley oscillator which provides a voltage step up. Then if a 12 volt vehicle battery 12 be used to supply the input to the oscillator, an output of about 60 volts can readily be obtained.

In order to achieve a constant current output from the oscillator 38 a limiting resistor 40 is placed in series with the oscillator output and the resonant circuit. The resistor 40 has a large resistance relative to the impedance change of the resonant circuit throughout full range of the reservoir liquid level.

In operation, the fuel in the reservoir 10 lies in the space between the inner and outer elements of the sensing element 18 and the level of the fuel in the sensing element is the same as the fuel level in the reservoir. This then determines the capacitance of the sensing element 18. The oscillator 38 generates a frequency of 386 kilocycles per second at an unloaded peak voltage output of about 60 volts. Since the Q of the inductor 36 is 100, the highest voltage which could be applied to the sensing unit 18 is 6,000 volts, even if the limiting resistor 40 were shorted out. This is within the permissible safety limit mentioned above, and during normal operation the voltage will be much less than this due to the resistor 40 in the oscillator output. The impedance of the resonant circuit depends upon the fuel level in the reservoir, and accordingly, the voltage measurement as registered on the meter 14 will be an indication of the fuel level. Of course, the meter 14 should be calibrated in terms of fuel level. The calibration scale will be fairly linear, but not exactly so. In particular, the lower end of the scale will be expanded thereby providing a more sensitive portion of the scale which frequently is of greatest interest. However, should it be desired to have a linear scale on the fuel indicators 14, this may be accomplished by altering the configuration of the sensing unit 18 to compensate for the nonlinearity. For example, instead of using a quarter inch O.D. rod for the inner element 32, a tapered rod having a three-eighth inch O.D. at the top and one-eighth inch O.D. at the bottom may be substituted. This configuration will provide a practically linear gage action. This technique of varying the configuration of the sensing unit may also be used to compensate for the irregular shapes of the fuel reservoir used in many applications.

Through a comparison of FIGURE 3 and FIGURE 1, it will be readily seen that the entire A.C. circuitry is confined within the reservoir 10 and that only the conductors 22 and 24 leading to the battery 12 and to the indicator 14 extend outside the fuel reservoir, and those conductors carry only direct current. Hence the fuel reservoir serves as a shield to prevent any radio interference which may be caused by inadvertent high frequencies produced by the oscillator 38, and further, since the conductors 22 and 24 carry no high frequency A.C. current, there are no transmission problems involved. A further benefit of including the component assembly 20 within the fuel reservoir is so that the natural cooling action caused by evaporation of the gasoline keeps the temperature of the circuitry within the same range as the temperature of the sensing unit 18.

Another feature of the liquid level gage according to the invention is that, due to the diode 44 in the meter circuit, the meter responds to rectified radio frequency signals only, and there are no stray D.C. currents present; hence, the meter circuit is inherently stable. Further, the indication on the meter is completely automatic in that the reading continuously changes as the fuel level changes and that no manual tuning of the circuit is required.

It is readily apparent that the invention provides a simple, inexpensive circuit which gives an automatic and accurate indication of liquid level and provides a means whereby the indicating meter can be remotely located from the liquid reservoir.

The embodiment of the invention disclosed herein is for illustrative purposes only and the scope of the invention is intended to be limited only by the following claim.

I claim:

A fuel gage system for monitoring the level of fuel in a container comprising a coaxial capacitor element located in said container and being electrically connected in series with an inductor element to form a series resonant circuit; a constant frequency oscillator having an input connected to a D.C. power source and an output connected to a high impedance resistance means, said constant frequency oscillator and said high impedance resistance means being serially connected to said series resonant circuit for applying a current of substantially constant magnitude and frequency through said series resonant circuit, the frequency of said oscillator being selected to resonate the resonant circuit to provide a minimum impedance when the fuel is at a predetermined low level so that with an increase in the quantity of fuel surrounding said coaxial capacitor an increase of impedance is provided; and a direct current voltmeter and series rectifier being connected across said series resonant circuit for directly measuring the change of impedance as a function of the D.C. voltage produced across the resonant circuit elements resulting from the applied current having substantially a constant magnitude and frequency, whereby a minimum voltmeter indication corresponds to said predetermined low fuel level and voltmeter indications correspondingly increase with increases of fuel level.

References Cited by the Examiner

UNITED STATES PATENTS

| | | | |
|---|---|---|---|
| 2,213,961 | 9/40 | Hunter | 73—304 |
| 2,582,399 | 1/52 | Smith | 73—304 |
| 2,621,517 | 12/52 | Sontheimer | 73—304 |
| 2,852,739 | 9/58 | Hansen | 324—61 |
| 2,866,336 | 12/58 | Hitchcox | 73—304 |
| 3,050,720 | 8/62 | Rich | 73—304 |

FOREIGN PATENTS

| | | |
|---|---|---|
| 796,188 | 6/58 | Great Britain. |

OTHER REFERENCES

Publication "Mechanical Measurements," by H. Roberts, published by Instruments Publications, 1951, pages 16 and 17.

ISAAC LISANN, *Primary Examiner.*